United States Patent [19]

Yeh

[11] Patent Number: 4,767,197

[45] Date of Patent: Aug. 30, 1988

[54] NONLINEAR OPTICAL MATRIX MANIPULATION

[75] Inventor: Pochi A. Yeh, Thousand Oaks, Calif.

[73] Assignee: Rockwell International Corporation, El Segundo, Calif.

[21] Appl. No.: 66,383

[22] Filed: Jun. 25, 1987

[51] Int. Cl.⁴ .......................... G02B 5/23; G06G 7/16; G06G 7/162; G06G 9/00

[52] U.S. Cl. .................................... 350/354; 364/841; 364/845; 364/846

[58] Field of Search ................ 350/354, 353; 364/822, 364/841, 845, 846, 837

[56] References Cited

U.S. PATENT DOCUMENTS 4,386,414 5/1983 Case .
4,588,255 5/1986 Tur et al. .
4,592,004 5/1986 Bocker et al. .
4,620,293 10/1986 Schlunt et al. .
4,633,427 12/1986 Bocker .
4,633,428 12/1986 Byron .
4,641,273 2/1987 Casasent .
4,651,297 3/1987 Schlunt .

OTHER PUBLICATIONS

Morimoto Akihiro and Tetsuro Kobayashi and Tadasi Sueta, "A Picosecond Optical Gate Using Photo Induced Grating," *Japanese Journal of Applied Physics,* Jun. 1981, pp. 1129–1133.

*Primary Examiner*—Eugene R. LaRoche
*Assistant Examiner*—Nathan W. McCutcheon
*Attorney, Agent, or Firm*—H. Frederick Hamann; Craig O. Malin; John J. Deinken

[57] ABSTRACT

A nonlinear optical matrix multiplier includes a nonlinear optical medium with a first optical input beam impinging on the medium, the transverse spatial intensity of the first input beam being modulated by a first two dimensional matrix. A second optical input beam impinges on the medium, with the transverse spatial intensity of the second input beam being modulated by a second two dimensional matrix. An optical probe beam impinges on the medium, the first input beam, the second input beam, and the probe beam being oriented with respect to one another and with respect to the medium such that the beams interact within the medium by means of four-wave mixing. A diffracted output beam emerges from the medium, with the transverse spatial intensity of the output beam modulated by the product of the first and second matrices.

25 Claims, 4 Drawing Sheets

NONLINEAR OPTICAL MATRIX MANIPULATION

BACKGROUND OF THE INVENTION

This invention is concerned with optical methods for manipulating one and two dimensional matrices.

Many signal and image processing algorithms can be expressed in terms of matrix operations. The mathematical functions of convolution and correlation, for example, may be implemented with matrix multiplication, which is one of the most basic operations in matrix algebra. An optical processing approach, with its inherent parallel processing capability, can offer significant improvements in the speed and capacity of such matrix operations. Such optical processors capable of multiplying two matrices are known in the art and optical matrix-vector multiplications have also been performed.

A typical optical processing system operates by directing one or more beams of light through an optical material of variable transmittance. The intensity of one of the light beams is modulated by a first input value, while the transmittance of the material is varied in accordance with a second input value. The solution of an equation containing the first and second input values is obtained by measuring the intensity of the beam after it passes through the optical material. Such an optical computing system can efficiently perform matrix operations when a mask for the input beam is subdivided into a plurality of separate zones and the zones are arranged in rows and columns to form a two dimensional matrix. The optical multipliers known in the art, however, utilize light modulators or transparencies to perform the multiplication and are consequently limited in speed, accuracy, and information capacity.

SUMMARY OF THE INVENTION

A nonlinear optical matrix multiplier includes a nonlinear optical medium with a first optical input beam impinging on the medium, the transverse spatial intensity of the first input beam being modulated by a first two dimensional matrix. A second optical input beam impinges on the medium, with the transverse spatial intensity of the second input beam being modulated by a second two dimensional matrix. An optical probe beam impinges on the medium, the first input beam, the second input beam, and the probe beam being oriented with respect to one another and with respect to the medium such that the beams interact within the medium by means of four-wave mixing. In this manner, a diffracted output beam emerges from the medium, with the transverse spatial intensity of the output beam modulated by the product of the first and second matrices.

In more particular embodiments, the second input beam may be orthogonal to the first input beam and the pump beam may be a uniform plane wave. The second two dimensional matrix may also be a vector, in which case the vector may be counterpropagating with respect to the first input beam. In the latter embodiment, the multiplier may further include a cylindrical lens for fanning the vector out into a two dimensional matrix of identical rows and a cylindrical lens for summing the output beam over one transverse dimension.

The nonlinear optical medium may be a photorefractive crystal or a Kerr medium.

The invention also includes a nonlinear optical interconnect, with a nonlinear optical medium, an optical vector input beam impinging on the medium, the transverse spatial intensity of the vector input being modulated by an optical device, and an optical interconnect input beam impinging on the medium, the transverse spatial intensity of the interconnect input beam being modulated by a predetermined two dimensional interconnect matrix. An optical probe beam impinges on the medium, with the vector input beam, the interconnect input beam, and the probe beam oriented such that the beams interact within the medium by means of four-wave mixing, thereby producing a diffracted output beam which emerges from the medium, the transverse spatial intensity of the output beam being modulated by the product of the first and second matrices, the output beam being applied as an input to the optical device.

DESCRIPTION OF THE INVENTION

This invention uses optical four-wave mixing in a nonlinear medium to perform matrix-matrix and matrix-vector multiplication, allowing a large number of values to be multiplied in parallel in a very short time. The two transverse dimensions orthogonal to the direction of propagation of a light wave are used to carry image processing information, offering the potential for high-throughput-rate optical computing and for easily reconfigurable optical interconnections.

A matrix is a rectangular array of numeric or algebraic quantities which is treated as an algebraic entity. A matrix containing m rows and n columns is conventionally referred to as being of order (m x n) and having mn elements. Although the preferred embodiments of the invention which are described here utilize square matrices for the sake of convenience, those skilled in the art will appreciate that the more general application of the invention to rectangular matrices is straightforward.

Figure 1:
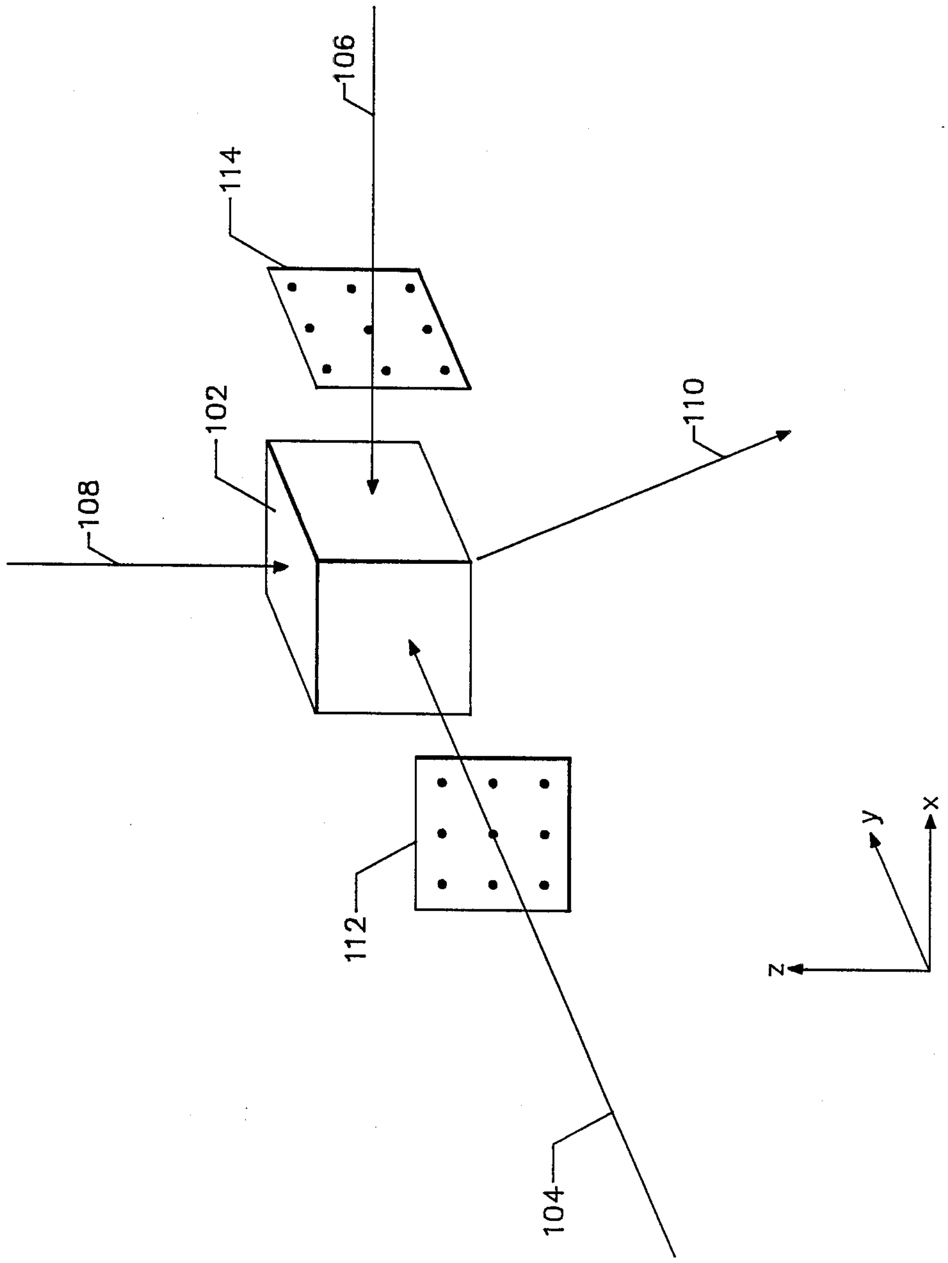
FIG. 1 is a schematic diagram, in perspective view, depicting the general form of a nonlinear optical matrix multiplier constructed according to the present invention.

FIG. 1 is a schematic diagram, in perspective view, depicting the general form of a nonlinear optical matrix multiplier constructed according to the present invention. The multiplier includes a nonlinear medium 102, such as, for example, a Kerr medium, in which a four-wave mixing process can occur. A first input pump beam 104 and a second input pump beam 106 impinge on the medium 102. A probe beam 108 impinges on the medium and is oriented such that the probe beam will interfere with the pump beam 104 to cause the formation within the medium of a first volume diffraction grating, which diffracts the second pump beam 106. Similarly, the second pump beam 106 interferes with the probe beam to cause the formation of a second volume diffraction grating, which diffracts the first pump beam 104. The diffracted beams combine to produce a diffracted output beam 110 which emerges from the medium. Alternatively, the beam combining process can be interpreted as the diffraction of the probe beam 108 by the volume grating formed by the pump beams 104 and 106.

In an outstanding feature of this invention, the transverse spatial intensity of the first pump beam 104 is modulated by a first two dimensional matrix 112, while the transverse spatial intensity of the second pump beam 106 is modulated by a second two dimensional matrix 114. Consequently, because of the nature of the four-wave mixing process, the transverse spatial intensity of the output beam 110 is modulated by the product of the first and second matrices. In the embodiment shown in FIG. 1, the pump beams are depicted as orthogonal. It is preferred, in order to minimize crosstalk, that the first pump beam and the second pump beam be directed orthogonal to each other, although it is not essential and the matrix multiplication process can function as long as the two pump beams are not counterpropagating.

Four-wave mixing is a nonlinear optical process in which three input waves mix to yield an output wave. Such a four-wave mixing process can be understood in terms of the recording and readout processes which occur in holography. Since the formation and readout processes take place at the same time, four-wave mixing is sometimes referred to as real-time holography. In mathematical terms, the pump beams 104 and 106 contain information about the matrices A(x,z) and B(z,y), respectively. In other words, $$E_{104}=A(x,z)e^{i(wt-ky)} \quad (1)$$

and $$E_{106}=B(z,y)e^{i(wt+kx)} \quad (2)$$

where each E represents an optical wave of angular frequency w and wave number k moving, in the case of the beam 104, in the +y direction, and, in the case of the beam 106, in the −x direction.

The matrices A and B can be either continuous or discrete. In the discrete case, each beam will consist of a matrix of separated small beams. As a result of the nonlinear response of the medium 102, induced volume gratings are formed when the beams interfere within the medium. These gratings, which contain information about the products of the matrix elements of the two matrices, can be described mathematically as:

$$\Delta n=n_2A(x,z)\,B^*(z,y)e^{i(\vec{K}\cdot\vec{r})}+c.c. \quad (3)$$

where K is the difference between the wave vectors of the matrix-carrying beams 104 and 106 and c.c. represents the complex conjugate of the preceding expression. The Kerr coefficient, $n_2$, is proportional to the third-order susceptibility $\chi^{(3)}$ of the medium. The grating is read out by the arbitrary probe wave $E_{108}$, which can be a plane wave $$E_{108}=e^{i(wt-\vec{k}\cdot\vec{r})} \quad (4)$$

propagating along a direction which satisfies the Bragg scattering condition. The two pump beams and the probe beam couple through the third-order susceptibility, $\chi^{(3)}$, to produce a diffracted fourth wave, $E_{110}$, which is proportional to the product of $E_{104}$ and $E_{106}$ and the complex conjugate of $E_{108}$. The fourth wave can thus be described as $$E_{110}=\chi^{(3)}E_{104}E_{106}E_{108}^* \quad (5)$$

Focussing now on the matrix mathematics, a matrix multiplication between two N×N matrices can be represented as C=AB, where $$C_{ij}=\sum_k A_{ik}B_{kj} \quad (6)$$

Note that this matrix multiplication consists of two main operations, a parallel multiplication and an addition. The diffracted beam $E_{110}$ consists of the integrated contribution from each part of the grating along the beam path and thus can be written:

$$E_{110}=C(x,y)\,e^{i(wt-\vec{k}'\cdot\vec{r})} \quad (7)$$

where $$C(x,y)=\int A(x,z)\,B^*(z,y)\,dz \quad (8)$$

and where the integration is carried out along the beam path. After the multiplication, the information about the product of the two matrices A(x,z) and B(z,y) will be impressed on the transverse spatial distribution of the diffracted beam $E_{110}$. Phase matching is an essential requirement for the invention, i.e., it is necessary that $$\vec{k}'=\vec{K}\pm\vec{k} \quad (9)$$

where $\vec{k}$ is the incident wave vector, $\vec{k}'$ is the scattered wave vector, and $\vec{k}$ is the grating wave vector. Due to the phase matching requirement, the readout beam 108 must be incident along a direction which satisfies the Bragg diffraction condition to achieve high efficiency. Although either isotropic or anisotropic media can be employed, in anisotropic nonlinear media the polarization states, as well as the direction of propagation, can be chosen such that the largest of the nonlinear susceptibilities is fully utilized.

The invention may also be used for matrix-vector multiplication. A vector is a multi-element mathematical quantity in which each element represents and quantifies one characteristic of the vector and the overall set of elements completely defines the vector. A vector V(x,y,z), for example, could be defined in cartesian coordinate space by the three elements x, y, and z, which specify the location of the tip of the vector with respect to the origin of the coordinate system. If there is no more than one row or one column in a matrix, it is a vector and its n elements can be regarded as vector components in an n-dimensional space.

Figure 2:
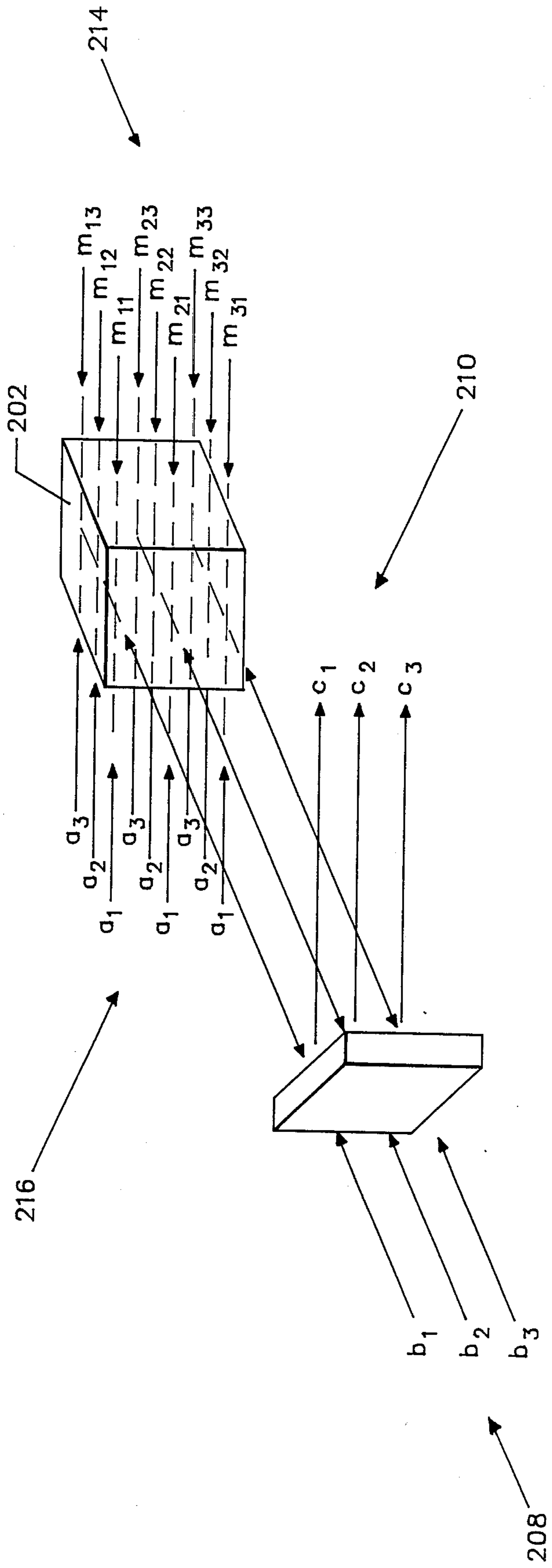
FIG. 2 is a schematic, perspective view of an optical matrix-vector multiplier.

In FIG. 2, which is a schematic, perspective view of an optical matrix-vector multiplier constructed according to the present invention, a 3-element vector 216, with elements $a_1$, $a_2$, and $a_3$, is fanned out into 3 rows of identical vectors. The resulting 3×3 matrix of small beams is directed to a nonlinear medium 202, in which the multiplication is accomplished by the interaction of the vector with a 3×3 matrix 214, which has elements $m_{ij}$ (i, j=1, 2, 3). The matrix 214, which also contains 3×3 small beams, is directed toward the medium in such a way that each beam m(i,j) of the matrix is counterpropagating in direction relative to the corresponding beam of the vector 216. Thus within the medium 202 there are 3×3 spatially separated regions which are each pumped by a pair of counterpropagating beams. Unlike the matrix-matrix multiplier described above, the vector and matrix beams can be counterpropagating in this matrix-vector multiplier, since each element of the matrix needs to interact with only one element of the vector. A 3-element probe beam 208, including elements $b_1$, $b_2$, and $b_3$, which are plane wave beamlets propagating in parallel, is directed into the medium 202 in such a way that each probe beam will propagate through a region of the medium in which one of the vector beams and one of the matrix beams intersect. As a result of the four-wave mixing process within the medium 202, each probe beam will generate one of the phase conjugated diffracted beams 210 with a magnitude c(i) which, within a proportional factor, can be written:

$$c(i) = \sum_j m(i,j) * a(j) \qquad (10)$$

where a(j) is the jth element of the vector a and m(i,j) is the matrix element.

Figure 3:
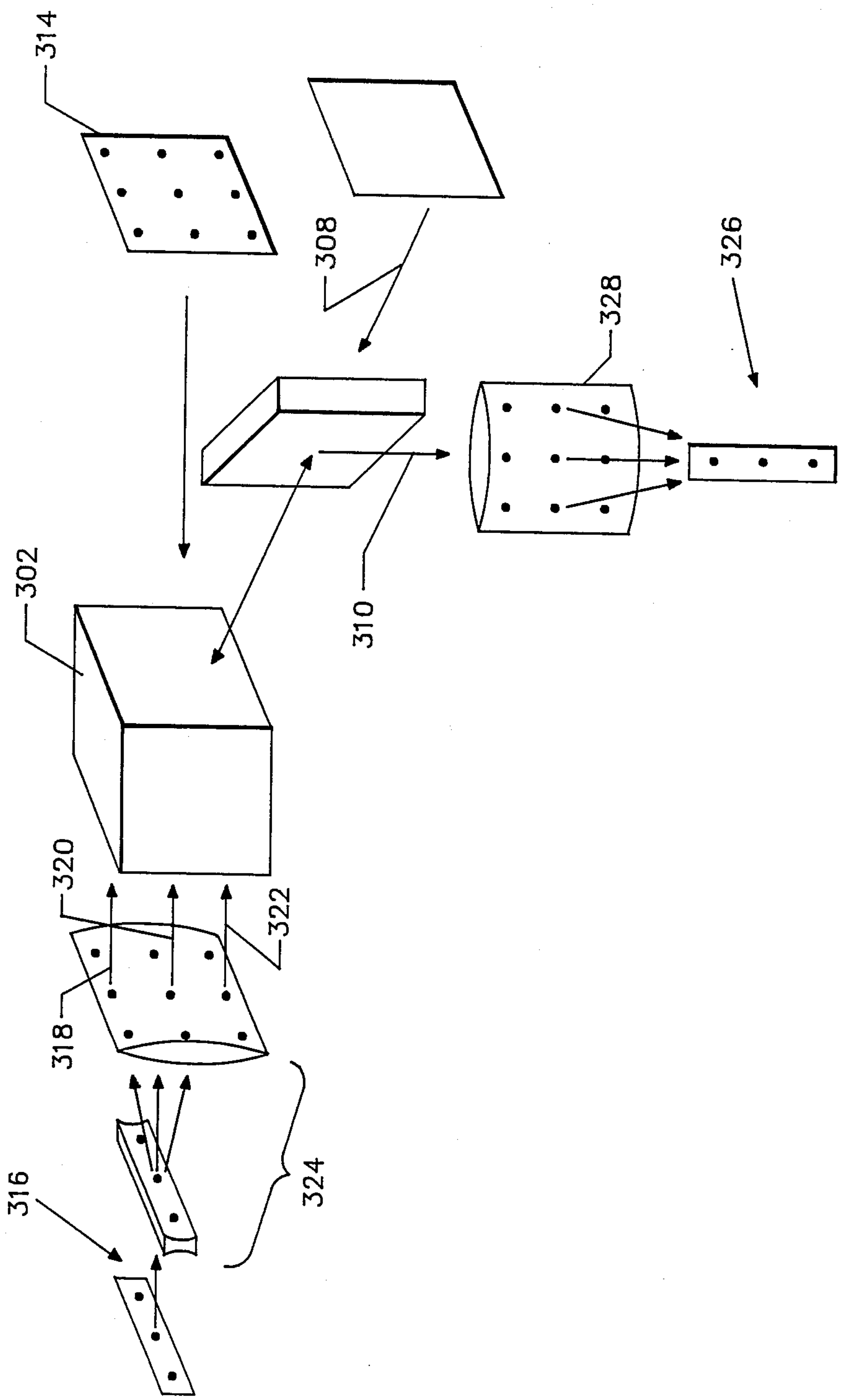
FIG. 3 is a schematic, perspective view of a second embodiment of an optical matrix-vector multiplier.

FIG. 3, which is a schematic, perspective view of another optical matrix-vector multiplier constructed according to the present invention, provides additional details regarding the matrix-vector multiplication scheme of this invention. A 3-element vector 316 is fanned out into 3 rows of identical vectors 318, 320, and 322 by a cylindrical lens 324. The resulting 3×3 matrix of small beams is directed to a nonlinear medium 302. A 3×3 matrix 314, which also contains 3×3 small beams, is directed toward the medium in such a way that each beam m(i,j) of the matrix is counterpropagating in direction relative to the corresponding beam of the vectors 318, 320, and 322. 3×3 probe beams 308, which are plane wave beamlets propagating in parallel, are directed into the medium in such a way that each probe beam will propagate through a region in which one of the vector beams and one of the matrix beams intersect. As a result of the four-wave mixing process within the medium 302, each probe beam will generate one of the phase conjugated diffracted beams 310. This matrix is reduced to an output vector 326 by the cylindrical lens 328.

The very large information capacity of the nonlinear matrix multiplier of this invention can be illustrated with a specific example. Consider a four-wave mixing process using an Ar ion laser at 4880A in a nonlinear medium which is a 1 cm cube. With these parameters, the grating spacing will be on the order of 0.5 um. Thus, a 10 um×10 um unit cell will provide sufficient area for each pixel of information. Consequently, a 1 cm cube of this nonlinear medium can handle matrix dimensions of 1,000×1,000. With a material response time of 1 nanosecond, such a matrix multiplier would have a potential data throughput rate of a quadrillion bits per second ($10^{15}$ bits/sec). In a binary embodiment, a 1 would be represented by a bright pixel, while a dark pixel would signify a 0. Additional flexibility can be introduced by using a gray scale of intensity rather than being limited to binary values.

Figure 4:
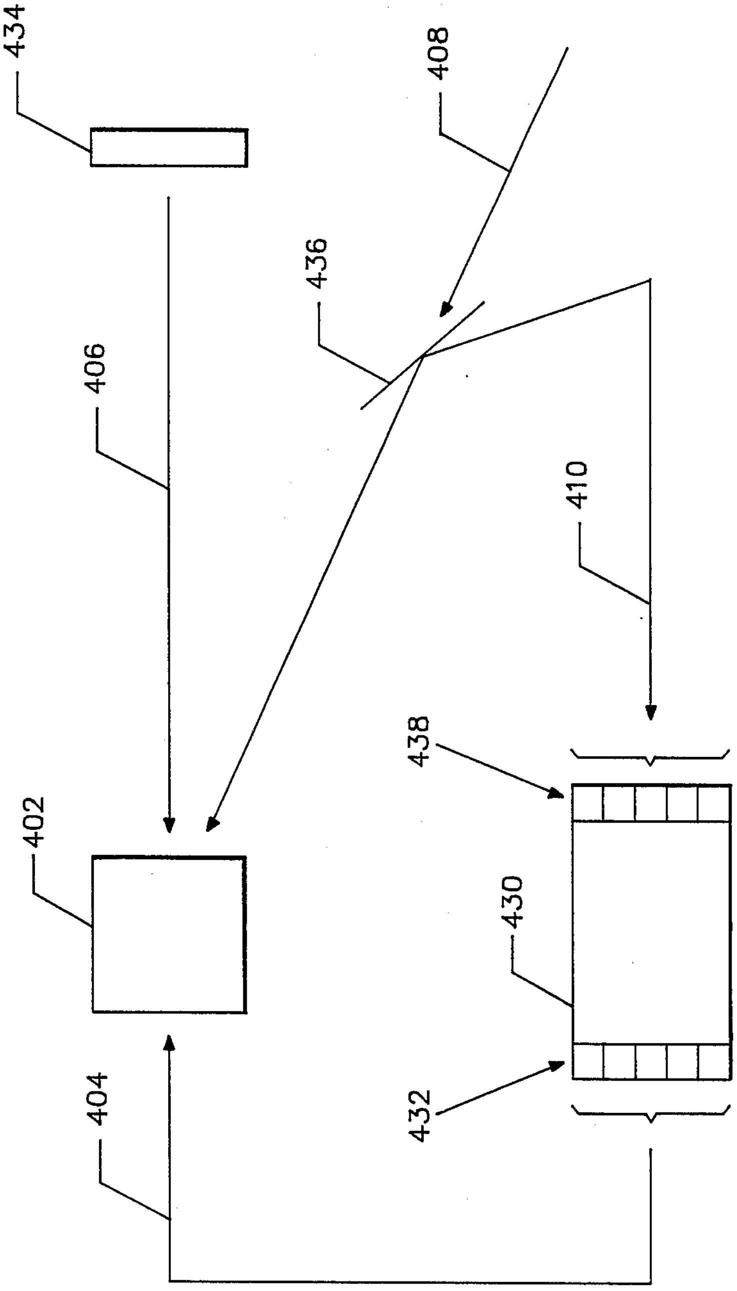
FIG. 4 is a schematic illustration of an embodiment of the invention used for an optical interconnect.

Another important application for this invention involves optical interconnects, which are projected to play a key role in both optical computing and VLSI (Very Large Scale Integration) semiconductor systems. A schematic illustration of an embodiment of the invention used for an optical interconnect is depicted in FIG. 4. Here the output from the optical device 430 (which can be optoelectronic VLSI processors or an optical logic gate array) is provided by an array of lasers 432. The output of the lasers constitutes the first pump beam 404, which is applied to the nonlinear medium 402. The second pump beam 406 is modulated by an interconnect matrix 434. A reference probe beam 408 is diffracted by the pump beams to produce a diffracted output beam 410 which, after reflection from a mirror 436, is applied as the input to the device 430 by means of an array of detectors 438. The most general interconnect system is one in which any gate output can be connected to the input of any gate or combination of gates. The effect of such an interconnect can be represented by the matrix equation $$O = M\,I \qquad (11)$$

where I is a vector representing the two-dimensional input array, M is the matrix representing the interconnect, and O is a vector representing the output array. In digital optical computing, the input array is actually the gate output array. Each matrix element m(i,j) is nonzero if, and only if, there is a connection between pixel j of the input array and pixel i of the output array. The matrix multiplication techniques of this invention can be used as an optical interconnect which provides both local and global communciation between gate outputs and gate inputs. In the case of matrix-vector multiplication, the vector may consist of N laser beams each containing a stream of data from the gate output. These N streams of data can be directed to N gate inputs. Thus each matrix can serve as an interconnect configuration. By varying the matrix M, the interconnect can be reconfigured.

The preferred embodiments of this invention have been illustrated and described above. Modifications and additional embodiments, however, will undoubtedly be apparent to those skilled in the art. The invention, for example, will operate with either a Kerr medium or a photorefractive material as the nonlinear element. If a photorefractive crystal is used, the orientation of the crystal should be selected to optimize the efficiency of operation. Furthermore, equivalent elements may be substituted for those illustrated and described herein, parts or connections might be reversed or otherwise interchanged, and certain features of the invention may be utilized independently of other features. The matrix-vector multiplication embodiment of this invention, for example, can also be used for matrix-matrix multiplication by decomposing a matrix into column vectors and then multiplying the matrix with each of the column vectors. In addition, the summation process can be obtained without the external cylindrical lens by using a probe beam which consists of a column of N equal beamlets. The probe is incident into the nonlinear medium in such a way that each of the probe beamlets is made to propagate through a row of N intersection regions. The phase-conjugation process will then automatically perform the summation as well as the multiplication functions, so that the phase-conjugated beam is the product of the matrix-vector multiplication. The matrix and vector information can actually be carried on any two of the three incident beams which are involved in the four-wave mixing process. Consequently, the exemplary embodiments should be considered illustrative, rather than inclusive, while the appended claims are more indicative of the full scope of the invention.

I claim:

1. A nonlinear optical matrix multiplier, comprising:

a nonlinear optical medium;

a first optical input beam impinging on the medium, the transverse spatial intensity of the first input beam being modulated by a first two dimensional matrix;

a second optical input beam impinging on the medium, the transverse spatial intensity of the second input beam being modulated by a second two dimensional matrix; and an optical probe beam impinging on the medium, the first input beam, the second input beam, and the probe beam being oriented with respect to one another and with respect to the medium such that the beams interact within the medium by means of four-wave mixing, thereby producing a diffracted output beam which emerges from the medium, the transverse spatial intensity of the output beam being modulated by the product of the first and second matrices.

2. The multiplier of claim 1, wherein the second input beam is orthogonal to the first input beam.

3. The multiplier of claim 1, wherein the probe beam further comprises a uniform plane wave.

4. The multiplier of claim 1, wherein the second two dimensional matrix further comprises a vector.

5. The multiplier of claim 4, wherein the vector is counterpropagating with respect to the first input beam.

6. The multiplier of claim 4, further comprising a cylindrical lens for fanning the vector out into a two dimensional matrix of identical rows.

7. The multiplier of claim 6, further comprising a second cylindrical lens for summing the output beam over one transverse dimension.

8. The multiplier of claim 1, wherein the nonlinear optical medium further comprises a photorefractive crystal.

9. The multiplier of claim 1, wherein the nonlinear optical medium further comprises a Kerr medium.

10. A method of nonlinear optical matrix multiplication, comprising the steps of:

providing a nonlinear optical medium;

modulating the transverse spatial intensity of a first optical input beam with a first two dimensional matrix;

directing the first beam into the medium;

modulating the transverse spatial intensity of a second optical input beam with a second two dimensional matrix;

directing the second beam into the medium;

directing an optical probe beam into the medium;

orienting the first beam, the second beam, and the probe beam with respect to one another and with respect to the medium such that the beams interact within the medium by means of four-wave mixing, thereby producing a diffracted output beam which emerges from the medium, the transverse spatial intensity of the output beam being modulated by the product of the first and second matrices.

11. The method of claim 10, wherein the second input beam is orthogonal to the first input beam.

12. The method of claim 10, wherein the probe beam further comprises a uniform plane wave.

13. The method of claim 10, wherein the second two dimensional matrix further comprises a vector.

14. The method of claim 13, wherein the vector is made counterpropagating with respect to the first input beam.

15. The method of claim 13, further comprising the step of fanning the vector out into a two dimensional matrix of identical rows.

16. The method of claim 15, further comprising the step of summing the output beam over one transverse dimension.

17. The method of claim 10, wherein the nonlinear optical medium further comprises a photorefractive crystal.

18. The method of claim 10, wherein the nonlinear optical medium further comprises a Kerr medium.

19. A nonlinear optical interconnect, comprising:

a nonlinear optical medium;

an optical vector input beam impinging on the medium, the transverse spatial intensity of the vector input being modulated by an optical device;

an optical interconnect input beam impinging on the medium, the transverse spatial intensity of the interconnect input beam being modulated by a predetermined two dimensional interconnect matrix; and an optical probe beam impinging on the medium, the vector input beam, the interconnect input beam, and the probe beam being oriented with respect to one another and with respect to the medium such that the beams interact within the medium by means of four-wave mixing, thereby producing a diffracted output beam which emerges from the medium, the transverse spatial intensity of the output beam being modulated by the product of the first and second matrices, the output beam being applied as an input to the optical device.

20. The interconnect of claim 19, wherein the probe beam further comprises a uniform plane wave.

21. The interconnect of claim 19, wherein the vector input beam is counterpropagating with respect to the interconnect input beam.

22. The interconnect of claim 19, further comprising a cylindrical lens for fanning the vector input beam out into a two dimensional matrix of identical rows.

23. The interconnect of claim 22, further comprising a second cylindrical lens for summing the output beam over one transverse dimension.

24. The interconnect of claim 19, wherein the nonlinear optical medium further comprises a photorefractive crystal.

25. The interconnect of claim 19, wherein the nonlinear optical medium further comprises a Kerr medium.

* * * * *